(12) United States Patent
Carden

(10) Patent No.: US 6,332,473 B1
(45) Date of Patent: Dec. 25, 2001

(54) APPARATUS FOR HORSE TRAILER

(76) Inventor: Cari B. Carden, 340 E. Hillcrest Ave., Bourbon, IL (US) 65441

( * ) Notice: Subject to any disclaimer, the term of this patent is extended or adjusted under 35 U.S.C. 154(b) by 0 days.

(21) Appl. No.: 09/617,279

(22) Filed: Jul. 17, 2000

Related U.S. Application Data

(60) Provisional application No. 60/145,110, filed on Jul. 23, 1999.

(51) Int. Cl.⁷ .................................................. E04H 15/06
(52) U.S. Cl. .................. 135/88.1; 135/88.07; 135/88.11; 135/88.14
(58) Field of Search .............................. 135/88.07, 88.14, 135/88.16, 88.12, 88.01, 88.11, 88.1; 160/67, 71

(56) References Cited

U.S. PATENT DOCUMENTS

| | | |
|---|---|---|
| 2,609,042 | 9/1952 | Chamberlain . |
| 2,741,195 | 4/1956 | Hartzner . |
| 3,228,406 * | 1/1966 | Jamba ................................ 135/88.07 |
| 3,934,924 | 1/1976 | Diliberti . |
| 4,754,774 * | 7/1988 | Leader ............................... 135/88.07 |
| 5,381,814 * | 1/1995 | Brandon ............................ 135/88.07 |
| 5,558,145 * | 9/1996 | Baka ..................................... 160/67 |
| 5,636,675 * | 6/1997 | Baka ..................................... 160/67 |
| 6,056,350 | 5/2000 | Brutsaert . |
| 6,123,136 * | 9/2000 | Williams ........................... 135/88.07 |

* cited by examiner

*Primary Examiner*—Beth A. Stephan
(74) *Attorney, Agent, or Firm*—Patent Trademark Services; Joseph H. McGlynn

(57) ABSTRACT

A roof mounted container which has a plurality of compartments, one of which stores a retractable cover and the other stores supports for a roof rack and/or awning support. The container can rotate so it can stretch toward the back of the vehicle or to the side of the vehicle.

10 Claims, 2 Drawing Sheets

APPARATUS FOR HORSE TRAILER

This a conversion of Provisional application Ser. No. 60/145,110, filed Jul. 23, 1999.

BACKGROUND OF THE INVENTION

This invention relates, in general, to trailers, and, in particular, to a trailer which can store and protect items on the trailer and a pull out awning for the trailer.

DESCRIPTION OF THE PRIOR ART

In the prior art various types of protective devices for trailers have been proposed. For example, U.S. Pat. No. 6,056,350 to Brutsaert discloses a vehicle which has a retractable sun shade.

The patent to Diliberti discloses a vehicle which has a frame work that attaches to the side of the vehicle with a retractable awning.

The patent to Hartzner discloses a portable awning that attaches to the roof of a trailer.

The patent to Brandon discloses a canopy that is attached to the roof of a vehicle and which can be pulled out to the side of the vehicle.

The patent to Chamberlain discloses a canopy attached to a roof of a vehicle and which can be extended out from a storage roll.

SUMMARY OF THE INVENTION

The present invention is directed to a roof mounted container which has a plurality of compartments, one of which stores a retractable cover and the other stores supports for a roof rack and/or awning support. The container can rotate so it can stretch toward the back of the vehicle or to the side of the vehicle.

It is an object of the present invention to provide a new and improved accessory for a trailer.

It is an object of the present invention to provide a new and improved accessory for a trailer which provides storage for the trailer.

It is an object of the present invention to provide a new and improved accessory for a trailer which provides a retractable cover which can rotate so it can stretch toward the back of the vehicle or to the side of the vehicle.

These and other objects and advantages of the present invention will be fully apparent from the following description, when taken in connection with the annexed drawings.

DESCRIPTION OF THE PREFERRED EMBODIMENT

Figure 1:
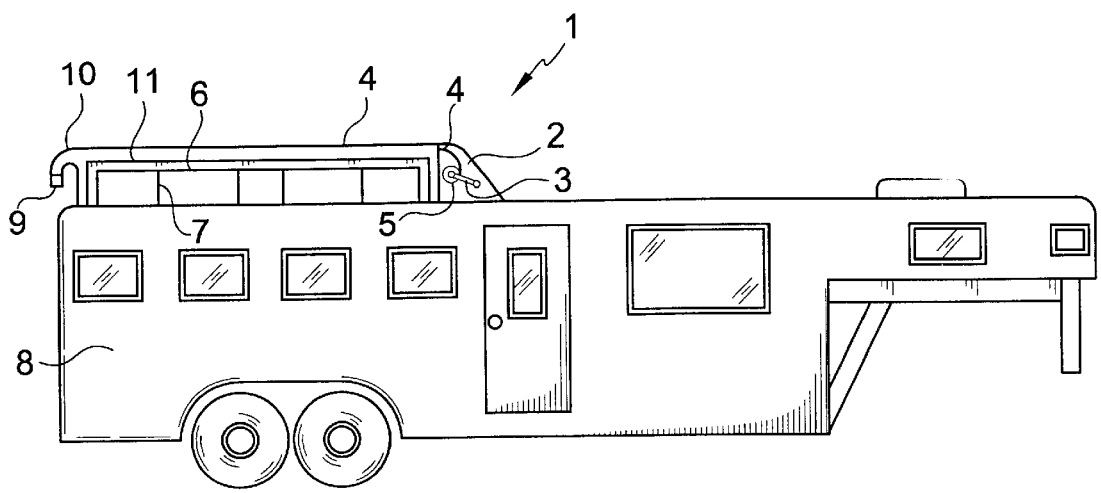
FIG. 1 is a side view of the present invention mounted on a trailer.

Referring now to the drawings in greater detail, FIG. 1 shows the present invention 1 mounted on the roof of a horse trailer 8. It should be noted that although the present invention is described as being used with a horse trailer, it is not limited to use only with such a trailer. The present invention can be used with any type of trailer or recreational vehicle. The present invention comprises a storage compartment 2 which is divided internally into two compartments 13, 14 (see FIG. 3). One of the compartments will be used to store an awning support framework comprising poles 15, 18, which, as shown in FIG. 4, can be assembled into a frame work to support the awning 4 (shown in FIG. 1). The compartment 14 can be accessed by a hatch 12 (see FIG. 2) which can be of any conventional design.

Figure 3:
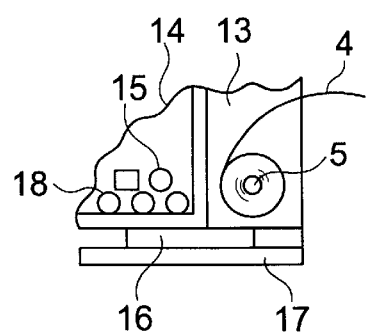
FIG. 3 is a partial view of the storage compartments of the present invention.
Figure 4:
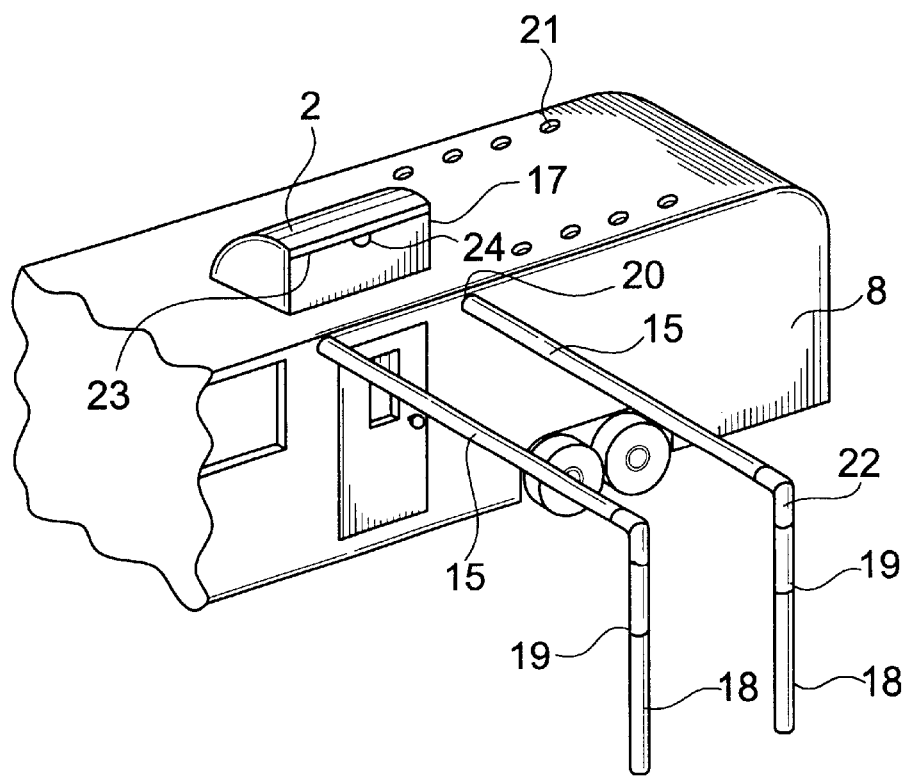
FIG. 4 is a partial perspective view of the present invention showing the storage compartments rotated 90°.
Figure 5:
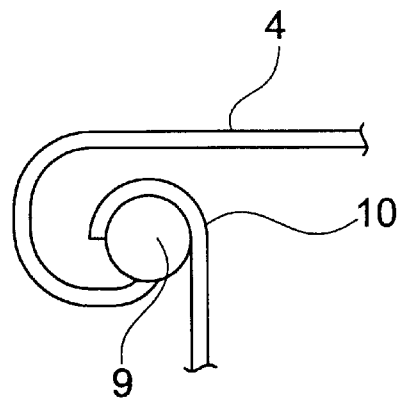
FIG. 5 is a partial view of the awning retainer of the present invention.

The second compartment, as shown in FIG. 3, stores an awning or canopy which can be made from any suitable material, but not limited to canvas or plastic. The awning 4 would be wound on a reel 5, which could be similar to a window shade reel which is spring wound and will allow the awning to be extended to cover and protect items mounted on the roof of the trailer, such as the bales of hay 11, shown in FIG. 1. Alternatively, the reel 5 could be operated by a crank 3 so the awning could be hand cranked onto and off of the reel 5. A hook 10 is attached to a rear portion of the roof of the trailer 8 by any conventional means to cooperate with a projection 9 on the end of the awning 4 to keep the awning in an extended position (see also FIG. 5).

Figure 2:
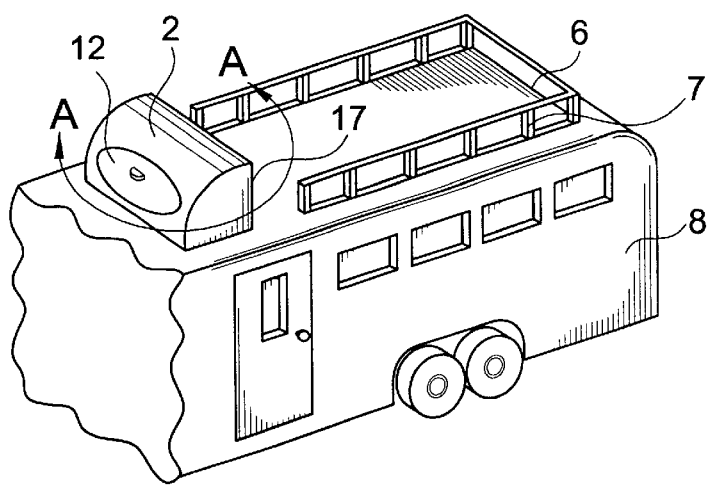
FIG. 2 is a partial perspective view of the present invention.

As shown in FIGS. 1 and 2, a roof rack formed of vertical and horizontal poles 6, 7 can be attached to the roof of the trailer to support items stored on the roof, such as bales of hay 11. The vertical poles 7 can be secured to apertures 21 in the roof (see FIG. 4) in order to make the rack removable. The horizontal and vertical poles 6, 7 can be attached to each other in any conventional manner.

The compartment 2 is rotatable on the roof of the trailer 8, as shown by the arrows AA, in FIG. 2. The compartment is rotatable through an arc of 90° so the awning 4 can be extended to the rear of the trailer 8, as shown in FIG. 1, or when the compartment 2 is rotated 90°, it can be extended to the side of the trailer and secured to the poles 15, 18 (see FIG. 4). The side 19 of the compartment 2 has a slot 23 through which the awning 4 can be pulled to extend or retract the awning. In this manner the awning can be pulled out without opening the compartment. Also, the end of the awning has a ring 24, or some other projection, so the awning can be easily grasped and manipulated.

The compartment is secured to a base 16 (see FIG. 3) and the base is secured to a second base 17 which in turn is secured to the roof of the trailer. The bases 16, 17 are similar to a conventional "Lazy Susan", and therefore, no further description is necessary. The two bases will rotate with respect to each other and, therefore, will allow the compartment to be rotated from the position shown in FIG. 2 to the position shown in FIG. 4, to either cover the back of the trailer or to extend from the side of the trailer. The compartment can be secured in either position by any conventional means such as, but not limited to, a friction catch or spring biased detents between the two bases.

When the awning is extended to the side of the trailer, the poles 15, 18 will be secured together in the form shown in FIG. 4. The horizontal poles 15 will be secured into apertures 20 in the side of the trailer and held there by any conventional means such as, but not limited to, a friction fit. The vertical poles 18 are secured to the horizontal poles 15 by conventional fittings 22. In addition, the poles 18 are telescoping as shown at 19 to adjust the height of the poles to different terrain.

Although the Apparatus for Horse Trailer and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A storage apparatus for a trailer comprising:

a storage compartment, said storage compartment having means for rotatably mounting said storage compartment to said trailer, said storage compartment being rotatable from a first position to a second position, and an awning mounted within said storage compartment, means for holding said awning in a retracted position where said awning is contained Within said storage compartment, and means for holding said awning in an extended position where said awning is extended out of said storage compartment.

2. The storage apparatus as claimed in claim 1, wherein said means for holding said awning in a retracted position is a reel.

3. The storage apparatus as claimed in claim 1, wherein said means for holding said awning in an extended position is a projection on said awning which cooperates with a hook adapted to be attached to said trailer.

4. The storage apparatus as claimed in claim 1, wherein said storage compartment is divided into at least two internal compartments, one of said at least two internal compartments containing said awning, and another of said at least two internal compartments holding a support structure for said awning.

5. The storage apparatus as claimed in claim 1, wherein said storage compartment is rotatable through an arc of 90°.

6. The storage apparatus as claimed in claim 1, in combination with a trailer, said trailer having a roof and sides, a rack removably attached to said roof, and when said storage compartment is in said first position, said awning can be extended over said rack.

7. The storage apparatus as claimed in claim 1, in combination with a trailer, said trailer having a roof and sides, a support frame work removably attached to one of said sides, and when said storage compartment is in said second position, said awning can be extended over said support frame work.

8. The storage apparatus as claimed in claim 7, wherein said support frame work comprises a plurality of poles, at least two of said plurality of poles being attached to a side of said trailer, said side of said trailer having apertures and said at least two of said plurality of poles extending into said apertures.

9. The storage apparatus as claimed in claim 8, wherein at least too of said plurality of poles are vertically arranged and are attached to said poles which are attached to said side of said trailer.

10. The storage apparatus as claimed in claim 1, where said storage compartment has a slot and a portion of said awning extending through said slot, so said awning can be extended without opening said storage compartment.

* * * * *

UNITED STATES PATENT AND TRADEMARK OFFICE
CERTIFICATE OF CORRECTION

PATENT NO.    : 6,332,473 B1
DATED         : December 25, 2001
INVENTOR(S)   : Cari B. Carden It is certified that error appears in the above-identified patent and that said Letters Patent is hereby corrected as shown below:

<u>Title page,</u>
Item [75], inventor's correct address should be -- P.O. Box 404, Bourbon, MO (US) 65441. --

Signed and Sealed this

Twenty-seventh Day of August, 2002

Attest:

Attesting Officer

JAMES E. ROGAN
Director of the United States Patent and Trademark Office